United States Patent Office 2,771,306
Patented Nov. 20, 1956

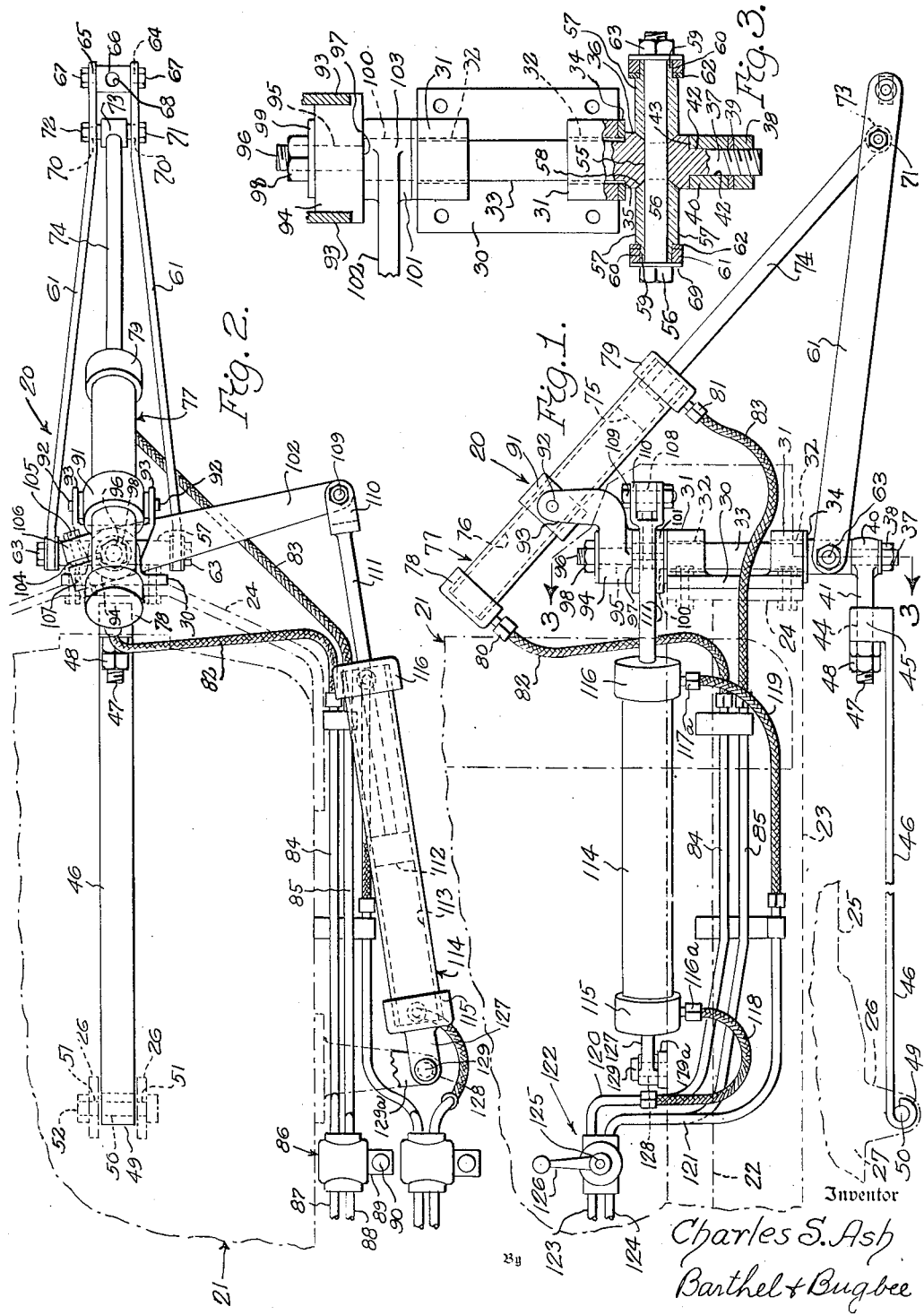

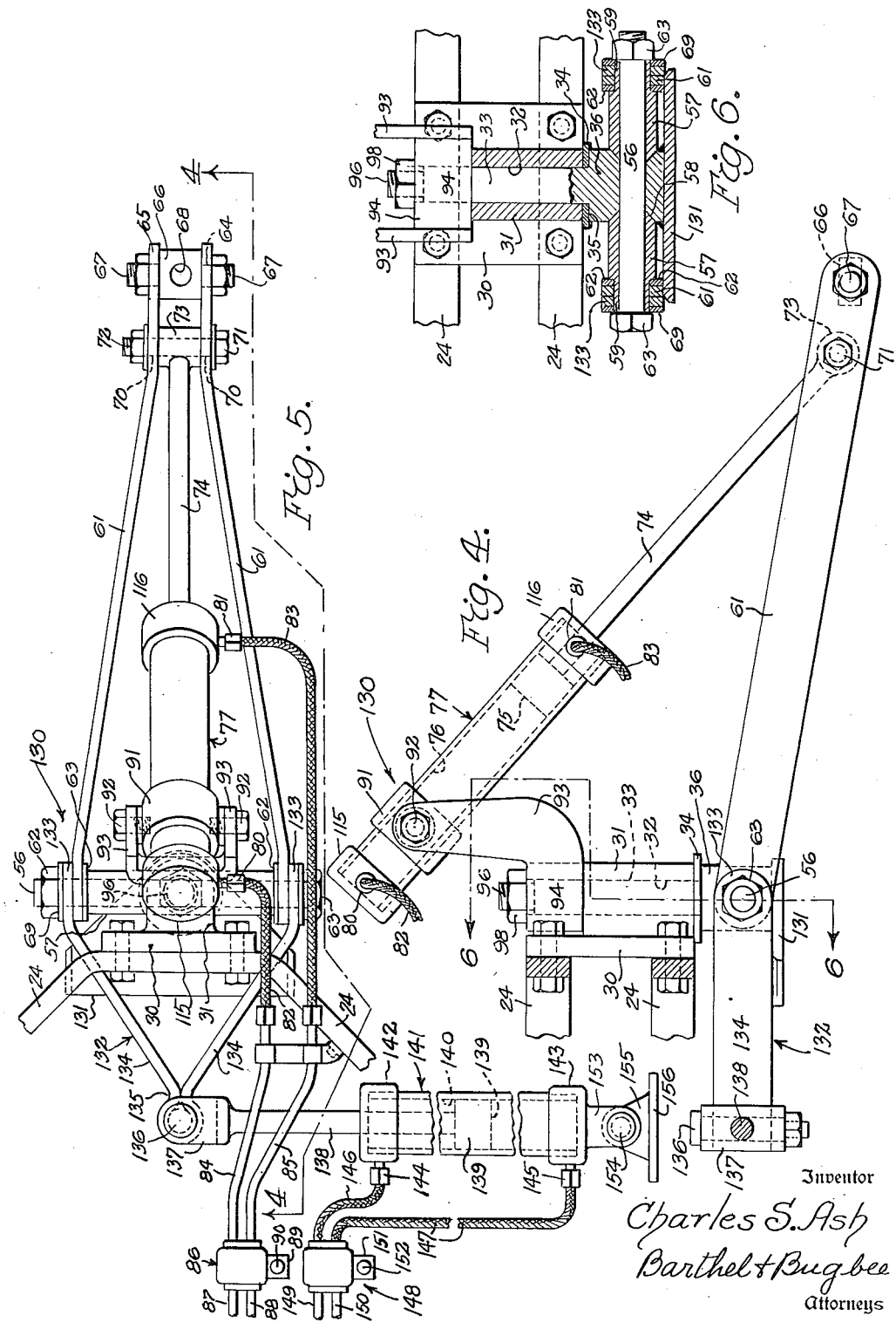

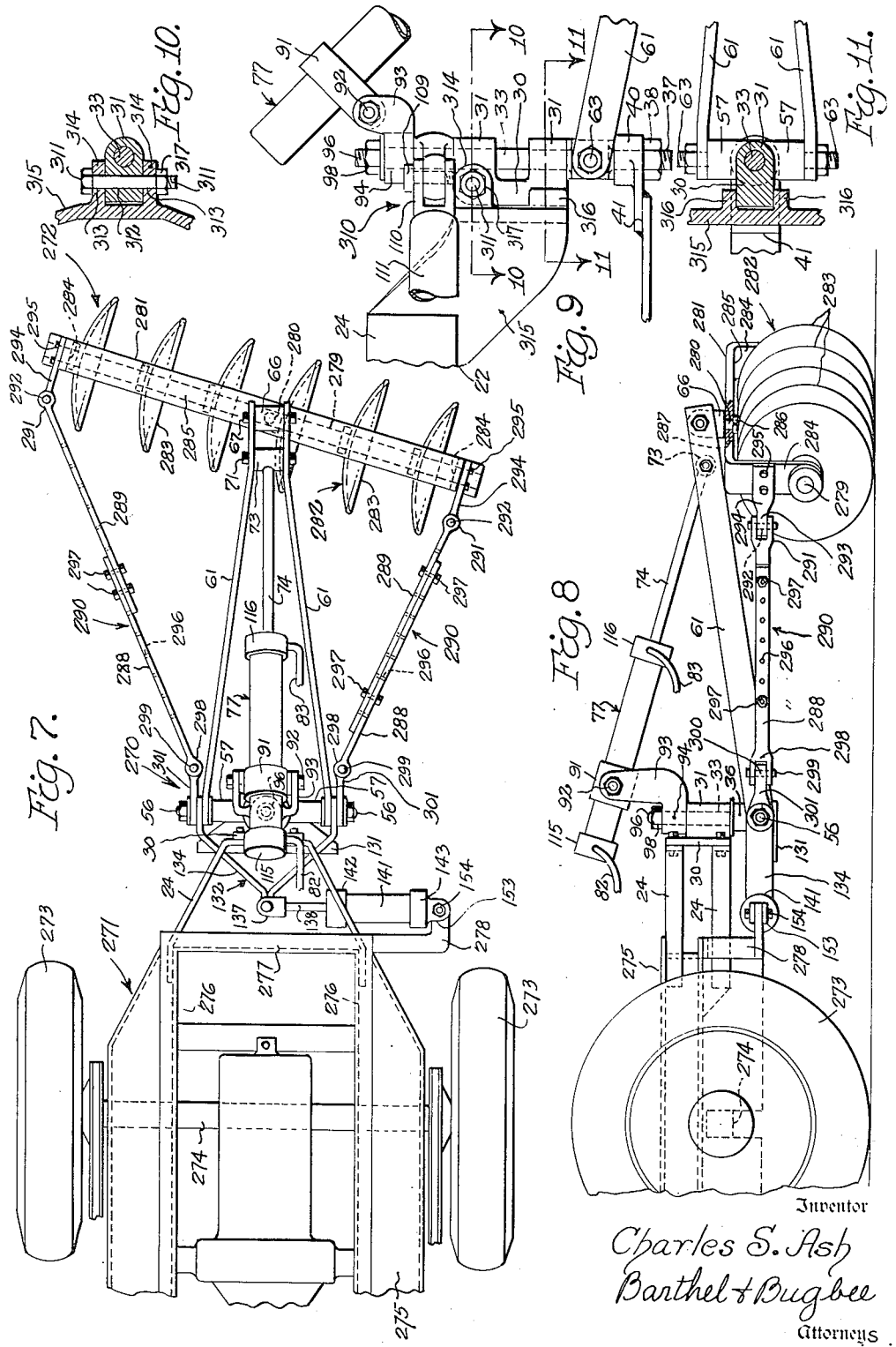

2,771,306

POWER-ACTUATED LATERALLY AND VERTICALLY ADJUSTABLE DRAFT MEANS

Charles S. Ash, Detroit, Mich.

Application April 28, 1952, Serial No. 284,844

2 Claims. (Cl. 280—456)

This invention relates to automotive vehicles, such as tractors, trucks, military vehicles, and the like intended for towing other vehicles or implements, and in particular, to auxiliary steering arrangements for such vehicles.

One object of this invention is to provide an auxiliary steering arrangement for use on automotive towing vehicles wherein the draw bar by which the towed vehicle is towed is shifted forcibly to one side or the other so as to alter the steering effect on this towing vehicle and compel it to hold to a desired direction of travel with a minimum need for using the regular steering mechanism, means being also provided for additionally raising and lowering the draw bar.

Another object is to provide an auxiliary steering arrangement of the foregoing character wherein the steering arrangement as well as the raising and lowering device thereof are adapted to use with a conventional draw bar, or with a disc harrow, rotary plow or other similar agricultural implement.

Another object is to provide an auxiliary steering arrangement of the foregoing character which is pivoted to the tractor or towing vehicle, but wherein additional means is provided for relieving the draw bar pivot bearing of the tension of the load and transferring it to a stationary portion of the tractor, preferably to a forward portion of the tractor frame or front axle so that the pull on the draw bar tends to pull downward on the front end of the vehicle instead of tending to pull the front end upward, as in prior tractors.

Another object is to provide an auxiliary steering arrangement of the foregoing character wherein the lateral shifting of the draw bar and the raising and lowering thereof are accomplished by fluid pressure cylinders or motors such as cylinders with reciprocating pistons therein.

Another object is to provide an auxiliary steering arrangement of the foregoing character wherein the draw bar is raised and lowered by a fluid pressure motor disposed obliquely thereto.

Another object is to provide an auxiliary steering arrangement of the foregoing character which is adaptable to a conventional tractor and utilizes certain portions of the mechanism already provided therein.

Other objects and advantages of the invention will become apparent during the course of the following description of the accompanying drawings, wherein:

Figure 1 is a side elevation of an auxiliary steering arrangement for an automotive vehicle, such as a tractor, according to one form of the invention, with the vehicle shown in dotted lines;

Figure 2 is a top plan view of the auxiliary steering arrangement shown in Figure 1;

Figure 3 is a fragmentary rear elevation, partly in vertical section, taken along the line 3—3 in Figure 1;

Figure 4 is a side elevation of a modified auxiliary steering arrangement adapted for attachment to a conventional tractor of different construction;

Figure 5 is a top plan view of the auxiliary steering arrangement shown in Figure 4;

Figure 6 is a fragmentary rear elevation, partly in vertical section, taken along the line 6—6 in Figure 4;

Figure 7 is a top plan view of a further modification of the invention as applied to a truck towing a rotary plow or disc harrow;

Figure 8 is a side elevation of the modification shown in Figure 7;

Figure 9 is a fragmentary side elevation of a pivot structure upon which the draw bars and raising and lowering motor are mounted;

Figure 10 is a horizontal section taken along the line 10—10 in Figure 9; and

Figure 11 is another horizontal section taken along the line 11—11 in Figure 9.

*General arrangement*

In general, all forms of the present invention provide an auxiliary steering arrangement for automotive towing vehicles, such as tractors, wherein the drawbar to which the load is attached is forcibly moved sidewise by a horizontally-acting motor, such as a fluid pressure cylinder, so that the line of application of the load is shifted laterally relatively to the center line of the towing vehicle. In this manner, the load itself exerts an oblique pull upon the towing vehicle in such a manner as to either facilitate the use of the normal steering gear associated with the front wheels of the tractor, or to supplant it altogether as, for example, where the front wheels are on muddy or slippery ground or on a side hill, and thereby unable to gain sufficient traction for satisfactory steering. The present invention provides not only this auxiliary steering arrangement for forcibly shifting the draw bar or draw bars horizontally relatively to the center line of the tractor or towing vehicle, but also provides means, such as an obliquely-reciprocating fluid pressure motor, for forcibly raising and lowering the draw bar or draw bars to adapt it to implements or towed vehicles at different attachment heights or to other conditions requiring a varying height of connection of the draw bar to the towed vehicle, implement or other load.

*Auxiliary steering arrangement with force-transferring device*

Referring to the drawings in detail, Figures 1 to 3 inclusive show an auxiliary steering arrangement, generally designated 20, attached to a conventional towing vehicle, generally designated 21, such as a tractor having a frame 22 with side members 23 and a rear cross member 24, an engine (not shown), a front axle and transmission 25 with downwardly-extending ears 26 on the lower central portion of the front axle casing 27 of the tractor 21. The auxiliary steering arrangement 20 shown in Figure 1 is equipped with means attached to the ears 26 whereby the tension exerted by the load or other towed vehicle upon the auxiliary steering device is transferred to the ears 26 rather than borne by the auxiliary steering arrangement 20, as described below.

Bolted to the rear frame cross member 24 at the center thereof is a bearing bracket 30 having aligned upper and lower journal bearing bosses 31 equipped with oversize bores 32 (Figure 3) for loosely receiving a pivot pin or king pin 33 with an excessive clearance therebetween, for the purpose explained below. Immediately below the lower journal bearing boss 31 is mounted a thrust washer 34 which in turn bears against a shoulder 35 on top of a enlargement 36 near the lower end of the pivot pin 33. Below the enlargement 36 the pivot pin 33 is again reduced in diameter as at 37 and threaded to receive a retaining nut 38 and washer 39 for holding in position the hub 40 of a tension arm 41. The hub 40 is bored as 42 (Figure 3) to receive the reduced diameter portion 37 and bears against the annular shoulder 43 between it and the enlargement 36 of the pivot pin 33.

The tension arm 41 passes through a bore 44 in a boss 45 (Figure 1) on the rearward end of a tension bar 46, the outer end of the tension arm 41 being threaded as at 47 to receive nuts 48 by which the position of the tension arm 41 relatively to the tension bar 46 may be adjusted and locked. The forward end of the tension arm 46 is provided with an eye 49 encircling a horizontal pivot bolt 50 (Figures 1 and 2) passing through aligned holes 51 in the ears 26 and supported by the latter. A nut 52 secures the pivot bolt 51 in position on the ears 26. By this means, any rearward pull exerted upon the pivot pin 23 is transferred through the tension arm 41 and tension bar 46 to the pivot bolt 50 and thence through the ears 26 to the front axle casing 27 of the tractor 21, thereby taking this force away from the bearing bores 32 in the bearing bosses 31. This construction increases the length of life of the mechanism by decreasing the bearing load and relieves the wear on the pivot pin 33 and bearing bores 32 (Figure 3).

The enlargement 36 of the pivot pin 33 is bored transversely as at 55 to receive a bolt 56 which passes through conical-ended spacing sleeves 57 with their ends seated within conical recesses 58 surrounding the bore 55 at opposite ends thereof (Figure 3). The outer ends of the sleeve 57 are provided with reduced diameter portions 59 adapted to pivotally receive the end bores 60 of spaced draw bars 61 provided with washers 62 and held in place by a retaining nut 63 (Figure 3). The draw bars 61 converge rearwardly toward one another and at their rearward ends are bored as at 64 to receive the threaded reduced diameter end portions 65 of a connection block 66 held in place by nuts 67 and provided with a cross bore 68 for the reception of a bolt, cable, chain or other means by which the towed vehicle, implement or other load is connected to the connection block 66. Washers 69 are interposed between the bolt 56 and its nut 63 and the respective draw bars 61 (Figure 3).

In order to raise and lower the draw bars 61, the latter are bored transversely as at 70 (Figure 2) to receive a pivot bolt 71 held in place by a nut 72. Pivotally mounted upon the bolt 71 and suitably bored to receive the latter is a hub 73 forming a cross head on the lower end of a piston rod 74, the upper end of which carries a piston head 75 reciprocable within the bore 76 of a hydraulic cylinder 77 having its opposite ends closed by heads 78 and 79 which are bored to receive the pipe connections or couplings 80 and 81 respectively connected to flexible conduits 82 and 83 which in turn are connected to pipes 84 and 85 leading to a conventional four-way valve 86 (Figure 2), provided with pressure-fluid delivery and exhaust pipes 87 and 88 controlled by a valve member 89 operated by a hand lever 90. Thus, by shifting the hand lever 90 to and fro, pressure fluid from a conventional hydraulic pump (not shown) connected to the intake or supply pipe 87 may be delivered to either end of the hydraulic cylinder 77 to cause the piston 75 to reciprocate in either direction to raise or lower the draw bars 61.

The hydraulic cylinder 77 is encircled by a collar 91 provided on its opposite sides with horizontally-extending trunnion pins 92. The trunnion pins 92 are supported by suitably bored ears 93 which project upward from a bracket 94 bored as at 95 (Figures 1 and 3) to receive the reduced diameter threaded upper portion 96 of the pivot pin 33 and resting upon an annular shoulder 97 at the lower end of the reduced diameter portion 96. A retaining nut 98 is threaded upon the reduced diameter portion 96 and, assisted by a washer 99, holds the parts in assembly.

Mounted upon the upper portion of the pivot pin 33 above the upper bearing boss 31 and below the annular shoulder 97 and bored as at 100 is the hub 101 of a crank arm 102, the bore 100 and the corresponding portion 103 of the pivot pin 33 being preferably squared in order to provide a non-rotatable connection therebetween. The hub 101 is split as at 104 (Figure 2) and provided with a tightening bolt 105 for pulling the separated portions 106 and 107 of the hub 101 together. The outer end of the crank arm 102 is bored as at 108 to receive a pivot bolt 109 (Figures 1 and 2) and a clevis 110. The latter is attached to the rearward end of a connecting rod 111, the forward end of which is connected to a piston head 112 reciprocable within the bore 113 of a hydraulic cylinder 114, the opposite ends of which are closed by cylinder heads 115 and 116 which are bored to receive pipe couplings 116a and 117a connected to flexible conduits 118 and 119 (Figure 1) which are in turn connected to pipes 120 and 121 leading to a conventional four-way valve 122 to which are connected pressure fluid supply and exhaust pipes 123 and 124. The four-way valve 122 is controlled by a valve member 125 which in turn is shifted by a valve lever 126 to supply and exhaust pressure fluid from either of the opposite ends of the hydraulic cylinder 114 to cause the piston 112 and piston rod 111 to reciprocate in opposite directions. Extending outwardly from the cylinder head 115 is a lug 127 which is bored as at 128 to receive a pivot pin 129 fixedly secured to the vehicle frame member 22 by a bracket 129a.

In the operation of the auxiliary steering arrangement 20 shown in Figures 1 to 3 inclusive, to steer the tractor or other towing vehicle to the right, the operator shifts the four-way valve 122 in a direction to supply pressure fluid to the forward end or head 115 of the hydraulic cylinder 114 and to exhaust this from the rearward end or head 116 thereof, causing the piston head 112 and piston rod 111 to move rearwardly (Figure 2), swinging the crank arm 102 counterclockwise and consequently swinging the draw bars 61 and connection block 66 to the right. The result is to shift the point of application of the load to the right of its previous position relatively to the center line of the vehicle, whereupon its off-center pull on the tractor will swing the forward end of the tractor to the right and thereby apply an auxiliary steering effect to the tractor.

To raise or lower the draw bars 61 and therefore raise or lower the connection block 66, the operator suitably shifts the valve lever 90 and valve member 89 of the four-way valve 86 (Figure 2) so as to admit pressure fluid to the lower or upper heads 79 and 78 respectively of the hydraulic cylinder 77, thereby pushing the piston head 75 and piston rod 74 upward or downward to raise or lower the draw bars 61.

Due to the excessively large clearance between the pivot pin 33 and the bores 32 of the bearing bosses 31 (Figure 3), the pull exerted by the load upon the draw bars 61 is transferred through the cross bolt 56 in the pivot pin 33 to the tension arm 41 and thence through the tension bar 46 to the pivot bolt 50 and ears 26 projecting downwardly from the front axle casing 27 of the tractor 21. It will be understood, of course, that the nuts 48 are suitably adjusted upon the threaded portion 47 of the tension arm 41 so that the pivot pin 33 occupies the position shown in Figure 3, with an adequate clearance between it and the bores 32 in order to achieve this desired condition of causing the transfer of the load to the front axle 27 rather than its being borne by the bearing bores 32 in engagement with the pivot pin 33. This arrangement locates the draw bar securing point at the lower front end of the vehicle, thus in operation, creating a downward pull which increases the traction in proportion to the draw bar pull. This also greatly adds to the stability of the vehicle.

*Modified steering arrangement without tension bar*

The modified auxiliary steering arrangement 130 shown in Figures 4, 5 and 6 is generally similar to that shown in Figures 1, 2 and 3, except that the auxiliary tension bar 46 and tension arm 41 are omitted. Accordingly, similar parts are designated with similar reference numerals, and the pivot pin 33 snugly engages the bearing bore 32 in the single elongated bearing boss 31. The construction adjacent the pivot pin 33 is otherwise substantially identical, as seen by a comparison of the general similarity of Figures 3 and 6, particularly as regards the hydraulic cylinder 77 for raising and lowering the draw bars 61. The swinging of the draw bars 61 to and fro horizontally, however, is accomplished at the lower end rather than at the upper end in the auxiliary steering arrangement 130, hence the crank arm 102 and its associated mechanism connected to the upper end of the pivot pin 33 are omitted.

Welded or otherwise suitably secured to the enlargement 36 of the pivot pin 33 (Figure 6) is a plate 131 which extends forwardly beneath a double V-shaped crank arm 132 having its rearward end 133 (Figure 5) bored to receive the cross bolt 56 and the reduced diameter end portions 59 of the sleeves 57. The ends 133 thus lie alongside and outboard of the forward ends of the draw bars 61 (Figure 5). The V-shaped crank arm 132 has side arms 134 which converge toward an eye 135. Passing through the eye 135 is a pivot bolt 136 which also passes through a suitably bored clevis 137 on the end of a connecting rod 138. The connecting rod 138 on its opposite end carries a piston head 139 which is reciprocable in the cylinder bore 140 of a hydraulic cylinder 141. The opposite ends of the hydraulic cylinder 141 are closed by cylinder heads 142 and 143 which in turn are bored and provided with pipe couplings 144 and 145 connected to flexible conduits 146 and 147 leading to a four-way valve 148 having pressure fluid supply and exhaust conduits 149 and 150 connected thereto. The four-way valve 148 is controlled by a valve member 151 and valve lever 152 in the usual way to supply pressure fluid to either end of the hydraulic cylinder 141 and exhaust it from the opposite end thereof. Extending outwardly from the cylinder head 143 are ears 153 (Figure 5) which are suitably bored to receive a pivot pin 154 which in turn passes through the ear or ears 155 of a bracket 156 secured to a stationary part of the towing vehicle, such as the tractor 21.

The operation of the modified auxiliary steering arrangement 130 as regards the raising and lowering of the draw bars 61 is substantially the same as the operation of the same parts in the form of the invention shown in Figures 1 to 3 inclusive, hence requires no repetition, it being controlled by suitable manipulation of the valve lever 90 of the four-way valve 86. To move the draw bars 61 to and fro, the operator suitably manipulates the valve lever 152 and valve member 151 of the four-way valve 148 to cause the piston rod 138 and crank arm 132 to move the draw bars 61 to and fro horizontally around the pivot pin 33. In this manner, the towing vehicle is steered, or assisted in steering, in the same way as described above in connection with Figures 1 to 3 inclusive.

*Modified auxiliary steering arrangement for rotary plow or disc harrow*

The modified auxiliary steering arrangement, generally designated 270, shown in Figures 7 and 8 is attached to a towing vehicle 271 for the control of an agricultural implement, generally designated 272, such as a rotary plow, and is generally similar to the auxiliary steering arrangement 130 shown in Figures 4 to 6 inclusive, similar parts bearing similar reference numerals. The towing vehicle 271 here shown as a tractor of the type disclosed and claimed in my co-pending application Ser. No. 162,617 filed May 18, 1950 for Tractor, but equally adapted to a truck or other automotive vehicle, is provided with wheels 273 mounted on an axle 274 supported by a frame 275 having side members 276 and a rear cross member 277, from the latter of which an angle bracket 278 extends laterally. Pivoted as at 154 to the angle bracket 278 are the ears 153 of the cylinder head 143 on one end of the hydraulic cylinder 141 previously described above in connection with Figures 4 to 6 inclusive, hence requiring no repetition.

The coupling block 66 secured to the rearward ends of the draw bars 61 is connected as at 280 to the U-shaped supporting member 281 of a conventional rotary plow, generally designated 282, having dished rotary plow elements 283 mounted in axially-spaced relationship upon an axle 279 supported in the side arms 284 which project downward from the top bar 285 of the U-shaped member 281. The pivot member 280 is provided with a nut or head 286 on its lower end beneath the top bar 285, which is drilled as at 287 to receive the pivot member 280. The U-shaped supporting member 281 of the rotary plow 272 is held in an oblique position relatively to the draw bars 61 by overlapping adjustment links 288, 289, which in assembly form the adjustable tie rods 290. The rearward ends of the tie rods 290 are forked as at 291, the forks 291 being pivotally connected as at 292 to the bored forward ends 293 of arms 294, the rearward ends of which are bolted as at 295 to the side bars 284. The overlapping links 288 are provided with spaced holes 296 adapted to receive bolts 297 whereby the links 288, 289 may be overlapped and locked in any desired position of adjustment. The forward ends of the links 288 are yoked as at 298 and bored to receive pivot pins 299 by which they are connected to the bored forward ends 300 of arms 301, the forward ends of which are bored to be carried by the cross bolt 56 outboard of the V-shaped crankarm 132. The remaining construction is as shown in Figures 4 to 6 inclusive.

The operation of the modified auxiliary steering arrangement 270 is similar to that described in connection with Figures 4 to 6 inclusive, and differs only in the manner of manipulating the rotary plow 272 and in its initial adjustment by means of the overlapping links 288, 289 forming the adjustable tie rods 290, as described above. When the tie rods 290 have been adjusted to such different lengths as will place the supporting member 281 of the rotary plow 272 at a suitable oblique angle relatively to the draw bars 61, the hydraulic cylinder 77 is supplied with pressure fluid in the manner previously described in connection with Figures 4 to 6 inclusive in order to raise or lower the draw bars 61 and consequently raise or lower the rotary plow 272. Auxiliary steering is accomplished in the same manner described in connection with Figures 4 to 6 inclusive, and in more detail in connection with the similar Figures 1 to 3 inclusive in order to swing the V-shaped crank arm 132 to and fro to swing the draw bars 61 to and fro to accomplish auxiliary steering.

*Modified pivot structure with additional horizontal pivot*

The modified pivot structure, generally designated 310, shown in Figures 9, 10 and 11 is generally similar to the pivot structure shown in the central portion of Figures 1 and 2, except that an additional horizontal pivot is provided. Similar parts are therefore designated with similar reference numerals. In Figures 9 to 11 inclusive, however, the bearing bracket 30 is not fixedly mounted on the frame of the vehicle, as in Figures 1 to 3 inclusive, but is pivotally mounted on a pivot bolt 311 (Figures 9 and 10) passing through a bore 312 in the upper part of the bearing bracket 30 and through coaxial holes 313 in ears 314 engaging opposite sides of the bearing bracket 30, the ears 314 projecting rearwardly from the support 315 which in turn extends downwardly and rearwardly from the rear cross member 24 of the vehicle frame 22. Also projecting rearwardly from the support 315 at locations spaced below the ears 314 are two spaced lugs 316 likewise engaging opposite sides of the bearing bracket 30 but at a location spaced below the horizontal pivot 311. The lugs 316 steady the bearing bracket 30, remove some of the strain from the horizontal pivot 311 and guide the bearing bracket 30 during a limited swinging motion around the horizontal pivot 311. A retaining nut 317 is threaded on the pivot bolt 311.

The operation of the modified pivot structure 310 is similar to that of Figures 1 to 3 inclusive, and also analogous to that of Figures 4 to 6 inclusive, hence requires no repetition. The modified pivot structure 310, as stated above, in addition to providing the action of the pivot structures shown in Figures 1 to 6 inclusive also provides the additional vertical swinging of substantially the entire structure around the horizontal pivot bolt 311 with side strain counteracted through the lugs 316.

The term "fluid pressure" as used herein is understood to apply not only to hydraulic fluids but also to compressed air or other gaseous fluids. In extremely cold climates, for example, it will be found that compressed air motors are more convenient to use than hydraulic motors, because of the excessive increase in viscosity of liquids, such as oils, used as working fluids in hydraulic motors at below zero temperatures.

What I claim is:

1. An auxiliary steering arrangement for a towing vehicle comprising a vertically-disposed bearing adapted to be mounted on the rearward portion of the towing vehicle, a vertically-directed pivot shaft pivotally mounted in said bearing, a laterally-extending arm connected to said pivot shaft and swingable horizontally therewith, an enlargement secured to the lower end portion of said pivot shaft and swingable horizontally therewith, a draw bar pivotally connected at its forward end to said enlargement for vertical swinging movement relatively thereto, a cylinder bracket secured to the upper end of said pivot shaft and swingable horizontally therewith, a first fluid pressure cylinder pivotally mounted on said cylinder bracket in a rearwardly and downwardly-inclined position and swingable vertically relatively to said bracket, said first cylinder having a reciprocable piston pivotally connected to said draw bar near the rearward end thereof, and a second fluid pressure cylinder having a portion thereof adapted to be pivotally connected to the towing vehicle and having a reciprocable piston therein pivotally connected to the outer end of said arm.

2. An auxiliary steering arrangement for a towing vehicle comprising a vertically-disposed bearing adapted to be mounted on the rearward portion of the towing vehicle, a vertically-directed pivot shaft pivotally mounted in said bearing, a laterally-extending arm connected to said pivot shaft and swingable horizontally therewith, an enlargement including a substantially horizontal cross member secured intermediate its opposite ends to the lower end portion of said pivot shaft and swingable horizontally therewith, a twin-armed draw bar pivotally connected at its forward end to the opposite ends of said cross member for vertical swinging movement relatively thereto, a cylinder bracket secured to the upper end of said pivot shaft and swingable horizontally therewith, a first fluid pressure cylinder pivotally mounted on said cylinder bracket in a rearwardly and downwardly-inclined position and swingable vertically relatively to said bracket, said first cylinder having a reciprocable piston pivotally connected to said draw bar near the rearward end thereof, and a second fluid pressure cylinder having a portion thereof adapted to be pivotally connected to the towing vehicle and having a reciprocable piston therein pivotally connected to the outer end of said arm.

References Cited in the file of this patent

UNITED STATES PATENTS

| | | |
|---|---|---|
| 1,765,788 | Daniel | June 24, 1930 |
| 1,962,423 | Brown | June 12, 1934 |
| 2,210,907 | Erickson | Aug. 13, 1940 |
| 2,394,210 | Sherman | Feb. 5, 1946 |
| 2,462,726 | Aerrie | Feb. 22, 1949 |
| 2,491,963 | Fons | Dec. 20, 1949 |
| 2,496,474 | Hyman | Feb. 7, 1950 |
| 2,512,733 | Andersen et al. | June 27, 1950 |
| 2,549,734 | White | Apr. 17, 1951 |
| 2,599,617 | Davis | June 10, 1952 |
| 2,600,016 | Miller | June 10, 1952 |
| 2,625,089 | Pursche | Jan. 13, 1953 |
| 2,640,708 | Fraga | June 2, 1953 |